(12) United States Patent
Bucher et al.

(10) Patent No.: US 7,660,572 B2
(45) Date of Patent: Feb. 9, 2010

(54) COMMUNITY NETWORKING USING NETWORKED AUDIO DEVICES

(75) Inventors: Timothy Bucher, Los Altos, CA (US); Arthur Anthonie Van Hoff, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 11/754,839

(22) Filed: May 29, 2007

(65) Prior Publication Data

US 2007/0281607 A1 Dec. 6, 2007

Related U.S. Application Data

(60) Provisional application No. 60/809,220, filed on May 30, 2006.

(51) Int. Cl.
*H04M 15/00* (2006.01)
*H04L 12/26* (2006.01)

(52) U.S. Cl. .................. 455/405; 455/566; 370/254

(58) Field of Classification Search ............... 709/230, 709/231, 232, 206, 224; 370/254, 260, 270, 370/271; 455/90.1, 406, 408, 416, 566, 405
See application file for complete search history.

(56) References Cited

U.S. PATENT DOCUMENTS

| | | | |
|---|---|---|---|
| 7,068,596 B1 | 6/2006 | Mou | |
| 7,317,716 B1 * | 1/2008 | Boni et al. | 370/352 |
| 2003/0016631 A1 * | 1/2003 | Piner et al. | 370/254 |
| 2006/0075091 A1 * | 4/2006 | Beyda et al. | 709/224 |
| 2006/0087987 A1 | 4/2006 | Witt et al. | |
| 2007/0067439 A1 * | 3/2007 | Mason et al. | 709/224 |
| 2008/0043639 A1 * | 2/2008 | Song | 370/254 |
| 2008/0065735 A1 * | 3/2008 | Szeto et al. | 709/206 |

\* cited by examiner

*Primary Examiner*—Blane J Jackson
(74) *Attorney, Agent, or Firm*—Workman Nydegger

(57) ABSTRACT

A computing system for gathering media status information and other information about contacts in a user's contact list includes a server, a user device, and one or more contacts (or contact devices). The user device communicates with the server and requests media status information regarding the contacts. Media status information may include information about the media content currently (or most recently) accessed by the contacts. The server receives the request from the user device, collects the information and sends it to the user device. The server may else send connection information to the user device. The user device receives the information and displays it to the user. The user device may include a message service such that messages can be sent to and received from the contacts. Also, the user may request particular media content accessed by the contacts.

8 Claims, 5 Drawing Sheets

COMMUNITY NETWORKING USING NETWORKED AUDIO DEVICES

CROSS-REFERENCE TO RELATED APPLICATIONS

This application claims the benefit of U.S. Provisional Patent Application Ser. No. 60/809,220 filed May 30, 2006, which application is incorporated herein by reference in its entirety.

BACKGROUND OF THE INVENTION

1. The Field of the Invention

The present invention relates generally to social network methods and systems for interacting with contacts in a network. More particularly, embodiments of the invention relate to systems and methods for collecting media status information for contacts identified in a user contact list of an electronic media device.

2. The Relevant Technology

Numerous forms of personal portable media devices are proliferating today. One example is satellite radio, or Satellite Digital Audio Radio Service (SDARS), which is the broadcast of digital audio programming via satellites directly to users. Through satellite radio, subscribers can receive high quality, uninterrupted, digital data such as radio over more than one hundred radio channels. The digital data may include, for example, digital quality music, talk radio, sports, news, weather, and the like. Often, a user of satellite radio has a small portable device they use to receive the digital data stream. Other examples of portable media players are portable digital audio devices, often referred to as MP3 players, portable CD players, portable DVD players, notebook computers, and the like.

Regardless of the type of portable media device, users often desire to know the media content accessed (e.g., viewed and/or listened to) by their friends, family, and acquaintances (also referred to collectively as "contacts") on the contacts' portable media players. This desire may arise from a user's mere curiosity about the contacts' interests, from a user's desire to discover new content that may be of interest to the user, or for other reasons. For instance, a friend having a taste in music similar to that of the user may be a good source for the user to turn to if the user wishes to discover new music that may be of interest to the user.

Whether the user desires to know the media content accessed by the user's contacts out of curiosity, to discover new music, or for any other reason, current methods of providing such information to the user are cumbersome and time consuming. For instance, unless a user is with a contact while the contact is accessing particular media content, the user would typically have to call, stop by, or otherwise communicate with the contact to determine the particular media content being accessed by the contact. For a user desiring to discover this information many times a day, this method could be both cumbersome to the user and annoying to the contact.

BRIEF SUMMARY OF THE INVENTION

These and other limitations are overcome by embodiments of the present invention, which include an electronic media device. The electronic media device comprises a graphical display, a user interface, a wireless internet connection, a media player, and a contact list module. According to embodiments of the invention, the graphical output device displays media content to the user and displays a list of contacts from the contact list module.

The electronic media device (also referred to as a "user device") can be used to obtain media status information for one or more contacts in the contact list. According to one embodiment, the user device communicates with a server capable of communicating with the user device and one or more other devices associated with the one or more contacts. The user device sends a request for media status information for the one or more contacts to the server, which the server receives. The server creates a session contact list including one or more contacts and a device identifier for the user device. The server also collects the information requested by the user device and sends it to the user device, which the user device receives. The user device can then display the received media status information to the user in the graphical display of the user device.

The media status information may include the type and name of media content currently being accessed by the one or more contacts. In one embodiment, the user device may include a messaging service, enabling messages to be sent to and/or received from the one or more contacts. In another embodiment, the user device may receive user input requesting particular media content currently being accessed by at least one of the one or more contacts. In response to the user input, the user device may access and play the particular media content or download the particular media content from a digital media provider.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments wherein the invention may be practiced. It is to be understood that other embodiments may be utilized and structural changes may be made without departing from the scope of the present invention.

Embodiments of the present invention relate to social network methods and systems for interacting with friends or contacts in a network using multimedia devices. The invention includes an electronic media device which is capable of gathering media status information for one or more friends, family members, and other acquaintances included in a contact list maintained by a user of the electronic media device. The media status information may include the types and names of media content that are currently being accessed by each of the user's contacts, the most recent media content that was accessed by the user's contacts, as well as other types of information regarding the media content associated with the user's contacts. The gathered media status information is displayed for the user of the electronic media device so that the user can quickly assess what types of media content are being accessed by the user's contacts.

In an alternative embodiment, the electronic media device further includes a communication mechanism for transferring messages to and from one or more of the contacts located within the user's contact list. For example, the electronic media device may allow the user to directly communicate with his or her contacts using an Internet Protocol (IP) based messaging protocol, such as Voice over Internet protocol (VoIP), instant messaging (IM), or the like, as well as other messaging protocols such as short messaging service (SMS), multimedia messaging service (MMS), and the like. The electronic media device of the present invention facilitates a user's ability to expand his or her media experience by providing media status information for individuals contained within the user's contact list, and by providing a convenient communication medium for discussing media content as well as other topics.

Figure 1:
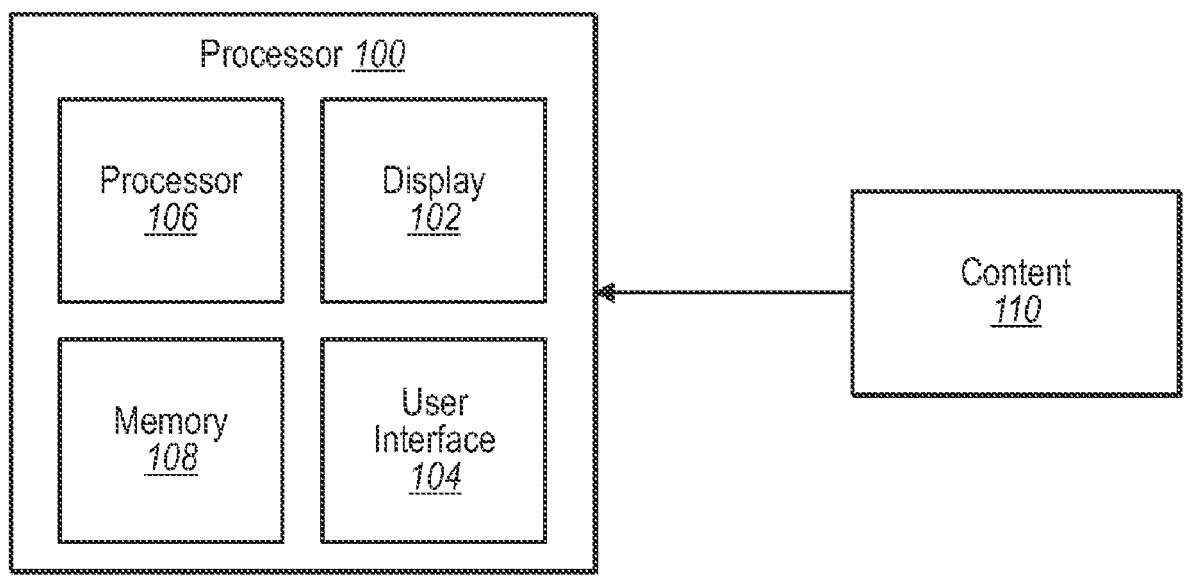
FIG. 1 abstractly illustrates an example electronic media device for implementing embodiments of the invention.

FIG. 1 illustrates an embodiment of a device 100 that can receive content including digital media from one or more sources. Examples of the device 100 may include, by way of example, a satellite radio device, a portable audio player (e.g., MP3 player or ipod), a portable DVD or CD player, a personal computer, a laptop computer, a cellular telephone, a personal digital assistant (PDA), and the like or any combination thereof.

Typically, the device 100 includes a display 102 that can convey information to the user of the device. For example, when the device 100 renders digital audio data, the display 102 may indicate the song title, the artist, the album title, the track number, the length of the track, and the like or any combination thereof. The device 100 also includes a user interface 104 (such as control buttons, speakers, headphones) or other means of providing input to the device 100 or providing additional content to the user. The user interface 104, by way of example, enables a user to navigate and activate the digital media and other content that is stored on the memory 108 of the device 100 or to navigate and perform any digital media or content that is received from an external source. The user interface 104 may enable a user to switch to another channel, such as in satellite radio, or otherwise select media content.

The content 110 represents different types of media including digital media that may be received by the device 100. Examples of the content 110 include, but are not limited to, digital music, talk audio data, television data, movie data, podcasts, sports data, weather data, news data, Internet data, and the like or any combination thereof. The content 110 can be either digital or analog in nature.

The memory 108 of the device can be used to store content or other user and/or device data. The memory 108, for example, may store digital music and/or video, graphics, play lists, user preferences, device settings, and the like or any combination thereof. Additionally, the memory 108 can store a contact list containing identities of one or more contacts.

Figure 2:
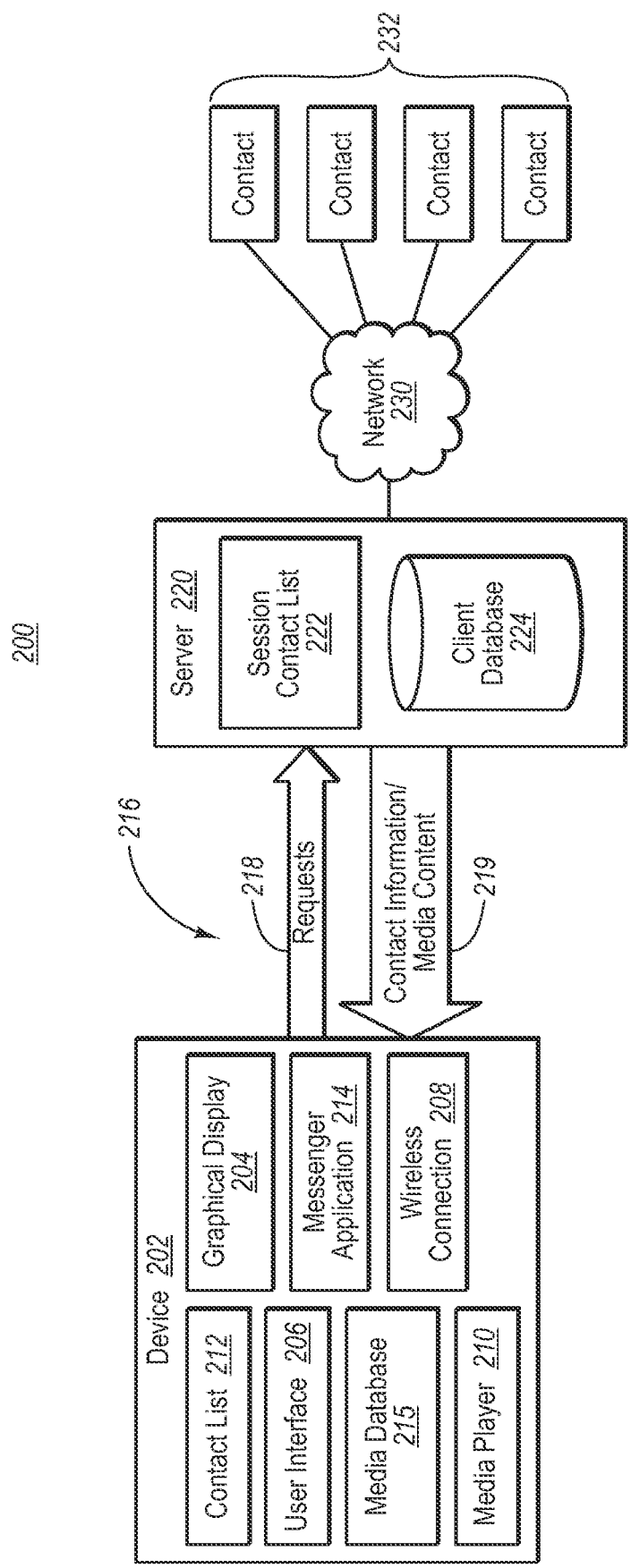
FIG. 2 depicts an operating environment in which media status information regarding contacts included in a user's contact list can be gathered and displayed.

Referring now to FIG. 2, a network 200 is provided which is configured for allowing a device 202 to gather media status information regarding contacts 232 included within a user's contact list 212 (also referred to as a "contact list module"). The network 200 includes a device 202 which communicates with a server 220 over a transmission medium 216. The server 220 may also communicate with the contacts 232 located within the user's contact list 212 over a network 230. The server 220 gathers information from each of the contacts 232 regarding the media activities they are engaged in. The gathered media status information is provided to the device 202 so that the device may display selected data regarding the media status information to the user of the device 202.

The device 202 may include any of the features described previously in reference to the device 100 of FIG. 1, as well as features described hereinafter and other features that will be apparent to one of ordinary skill in the art. In one embodiment, the device 202 is a handheld electronic device having a wireless connection 208 for transmitting and receiving information over a wireless transmission medium 216. For example, the wireless transmission medium 216 may include a satellite radio connection, WiFi (via a wireless hot spot), cellular networks, Bluetooth, and the like or any combination thereof.

The device 202 includes a media player 210 for playing at least one type of media content to the user via the user interface 206 and/or graphical display 204. The media content played by the media player 210 may include audio, video, podcasts, streaming data, Internet data, and the like or any combination thereof.

The device 202 further allows a user to compile a contact list 212 (also referred to as "Messenger List", "Buddy List", "Allow List", and the like). The contact list module 212 includes the identities of contacts 232 with which the user of the device 202 desires to exchange media status information. Furthermore, the contact list module 212 is configured to receive media status information associated with the contacts from the server 220. The contact list 212 may be configured to be displayed on the graphical display 204 of the device 202. Although the FIG. 2 example illustrates the contact list 212 as being stored on the device 202, the contact list may also be stored at the server 220 or other central location. In order to exchange media status information with the contacts 232 listed within the contact list 212, the user of the device 202 may connect to a server 220 and may login to the server, typically by entering a username and password. Although different servers may vary in the information gathered from the device 202 upon logging in, the device 202 may, for example, send a message 218 to the server 220 providing connection information such as a device identifier (such as an IP address), along with the contacts 232 included in the contact list 212, and requesting media status information regarding the contacts.

The server 220 may create a session or working contact list 222 having the user's contact list 212, as well as other information such as the device identifier. In one embodiment, the session contact list is used by the server during the duration of the login session and can be generated from the contact list 212 received from the device. The session contact list can include as few as one or as many as all of the contacts from the contact list. Alternately or additionally, the session contact list can be generated from a contact list of the user that is stored permanently on the server.

The server 220 may also include a client database 224 for storing information regarding each client that participates in the service provided by the server 220, among other information. After creating the session contact list 222, the server 220 can determine if any of the contacts 232 in the contact list 212 are currently logged in. The contacts 232 may include individuals using other handheld wireless devices, personal computers, laptops, or other electronic devices. The server 220 may then send a message to the device 202 including necessary connection information of the contacts, such as whether each contact is online, offline, away, busy, and the like. Upon receiving this information, the device 202 may provide the connection information to the user via the graphical display 204. The server 220 may also send connection information for the user of the device 202 to the user's contacts 232.

Furthermore, in accordance with the present invention, the server 220 may collect media status information from each of the contacts 232 that are currently online. For example, the server 220 may collect media status information regarding media activities that each of the contacts 232 are currently engaged in. For instance, the media status information may include song information, video information, podcast information, website information, gaming information, streaming audio information, and the like or any combination thereof. The media status information collected from each contact 232 may be returned 219 to the device 202, and the device may display the media status information for each contact on the graphical display 204.

If a contact 232 is not currently engaged in any media activity, or if a contact is not online or is otherwise unavailable, the server 220 may provide the device 202 with other information regarding the media content associated with each contact 232. For example, for contacts 232 for which no current media content status information is available, the server 220 may provide the device 202 with information regarding the most recent media activity engaged in by those contacts. Such information may be stored, for example, within the client database 224 on the server 220. Thus, the present invention provides a method and system for allowing a user of a device 202 to quickly find out what type of media each of his friends, family, and other acquaintances included within his or her contact list 212 is currently engaged in, or has recently participated in.

In one embodiment of the invention, the contacts included within the contact list 212 are divided into one or more groups. The groups may be hierarchically organized in accordance with criteria that may be established by the user. For example, a user may place certain contacts that have music tastes that are similar to those of the user into a first group, and other contacts having differing music tastes into a second group. Likewise, the user may create groups according to music genre, and organize the contacts into the groups according to the music genre each contact typically listens to. The groups created by the user can be ranked as to importance or hierarchically organized, so that the user can access the groups that are of particular interest at a given moment, and quickly assess the media content being accessed by the contacts included within those groups.

In one embodiment, in addition to collecting media status information for each of the contacts 232 contained within the user's contact list 212, the network 200 also allows the user of the device 202 to access the media items associated with the contacts 232 located in the user's contact list 212. For example, the graphical display 204 may provide the user with a list of the four contacts 232, as well as media status information indicating the items being accessed by each contact. If the user is interested in accessing the media item that is being accessed by one of the contacts, the user is provided with a feature that allows the user to access the same media item being accessed by his or her contacts. For instance, the user may be able to provide user input requesting the media item.

In one embodiment, upon receiving user input requesting a media item being accessed by one of the contacts 232, the device 202 and/or the server 220 determine if the requested media item is already contained within a media database 215 stored on the device 202. If the media database 215 on the device 202 already contains the media item, the media player 210 is able to access the media item locally from the media database 215 in order to play the media item to the user. If it is determined that the requested media item is not already contained within the media database 215, the requested media item may be downloaded via the connection 216 from a digital media provider. In one embodiment, a file containing the complete version of the requested media item is downloaded to the device 202. In another embodiment, only a portion of the media item is downloaded to the device 202 for allowing the user of the device to hear or watch a sample of the media item prior to deciding whether to download the entire version of the media item. In one embodiment, the partial version of the media item may be downloaded to the device 202 in a low-resolution format. Downloading a partial version of the media item to the device 202 may help the user preserve the bandwidth of the device, and may also provide the user with a free sample of the media item in the event that the entire media item is only available for purchase.

The requested media item may be downloaded to the device 202 using a variety of digital media providers. For example, in one embodiment, the media item may be downloaded directly from the contact 232 who originally supplied the media status information regarding the requested media item. For example, a peer-to-peer file sharing protocol may be employed when downloading a media item directly from a contact's device. In another embodiment, the requested media content may be downloaded via a digital music service, such as iTunes, Napster, Amazon, and the like, and saved locally within a media database 215 located on the device 202.

Alternatively, where the requested media content includes real time streaming data provided by a media source, such as an Internet web site, terrestrial radio, or the like, the device 202 may automatically establish a connection with the same media source supplying the media content to the contact 232. Other digital media providers may also be employed for downloading the requested media content to the device 202, as will be appreciated by one of skill in the art.

Although the FIG. 2 example network 200 includes the use of a server 220 for providing a communication link between the device 202 and the contacts 232, the server 220 is not always a necessary component of the network 200. For example, interaction between users can be transmitted over local area networks using wireless access points, over the internet, in peer-to-peer communication in ad hoc wireless networks, and the like or any combination thereof.

In one embodiment, the device 202 further includes a messenger application 214 for allowing the user of the device to communicate directly with one or more of the user's contacts 232. For example, the messenger application 214 may provide an IP-based connection for allowing the user of the device 202 to communicate with the user's contacts 232 via IM, VoIP, and the like. Likewise, other digital communication mechanisms may be employed, including SMS, MMS, email, and the like. Therefore, the device 202 may provide a user with media status information for contacts 232 contained within the user's contact list 212, and may further allow the user to immediately contact another user to discuss various types of media, as well as other topics. Advantageously, when communicating using VoIP, the users of various devices may communicate without being required to type any information into a keypad, and without being required to subscribe to a traditional telephone or cellular service. The device may further include a microphone (not shown) for capturing the user's voice when participating in a VoIP conversation.

In one embodiment, the device 202 may further include pre-scripted messages that may be saved within the media database 215 or other storage device that may be sent to the contacts 232 included in the contact list 212. Example pre-scripted messages may include: "Check out what I'm listening to"; or "You should watch this video", and the like. A simple interface may be provided for allowing the user to select one or more of the pre-scripted messages to be sent to a user. The message may be configured to automatically include a description of or a link to the media item being accessed by the user when the message is sent.

When the user of the device 202 logs off, the server 220 terminates the user's session. The server 220 may also send messages to each of the user's contacts 232 to indicate that the user is no longer online. Then, the server 220 typically deletes the session contact list 222.

Figure 3:
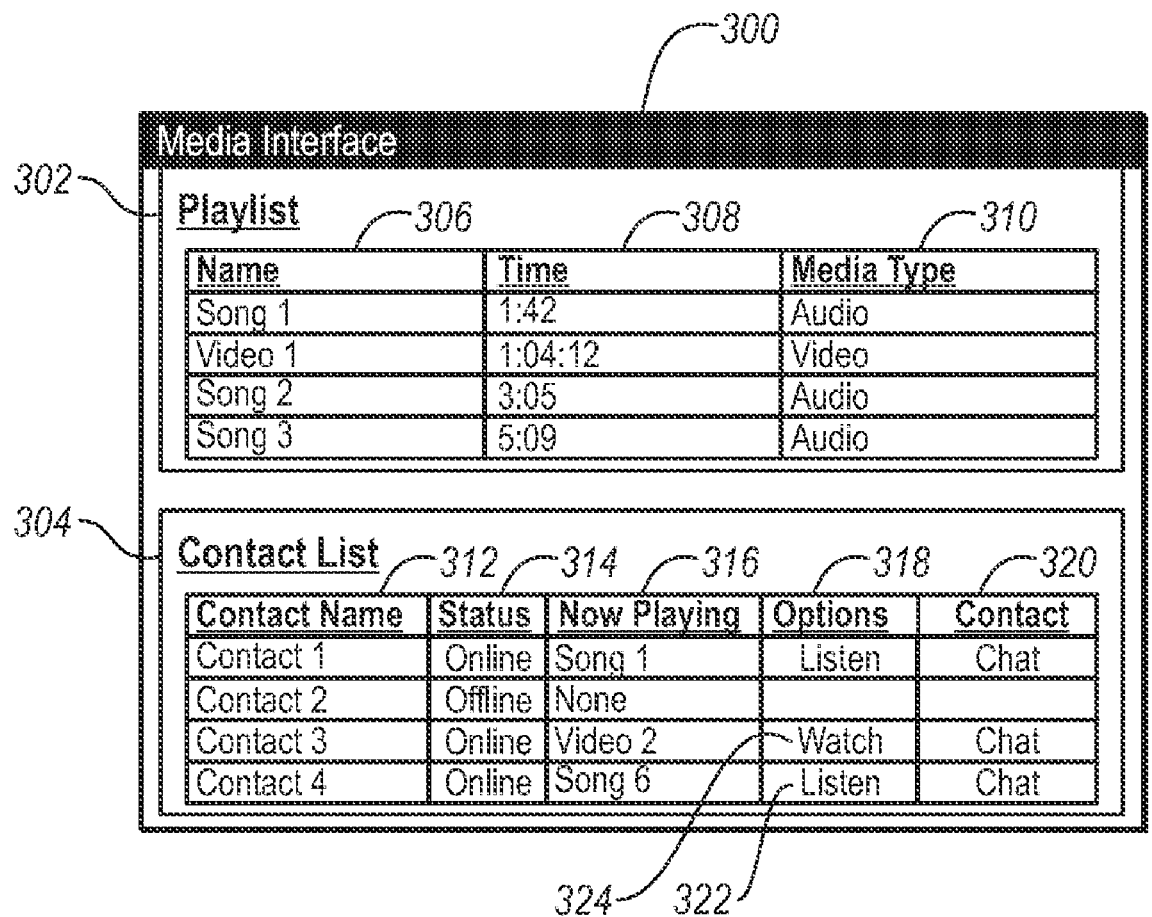
FIG. 3 illustrates one embodiment of a media interface that may be employed for displaying media and contact information.

Referring now to FIG. 3, an example media interface 300 is provided that may be employed for displaying media and contact information on the graphical display 204 of the device 202 of FIG. 2. The interface 300 is provided by way of example, and it will be appreciated that various alterations can be made to the interface while maintaining the concept of allowing a user to access media status information regarding the contacts 312 located within a contact list 304.

The media interface 300 may include a playlist area 302 and a contact list area 304. The playlist area 302 may include the names 306 of each media item that is currently on the device, the play time 308 of each media item, the media type 310 of each media item, as well as other information regarding the media items 306 included within the playlist 302. The contact list 304 may include a list of each contact name 312 included within the user's contact list. A status 314 may be provided for each contact, which may indicate whether each contact is online, offline, away, busy, and the like. The contact list 304 may also include media status information for each of the contacts 312, such as a list of the media items currently being played 316 by each contact. As described above, if a particular contact is not currently engaged in any media activity or the media status information for a particular contact is currently unavailable, the currently playing list 316 may instead include the last media item that was accessed by the contacts.

The contact list 304 may also include an options menu 318, which allows the user to select a feature that is available for each of the contacts 312 listed within the contact list 304. For example, if the user would like to access the same media item that is being accessed by one of the contacts of 312, the user may select an icon (e.g., 322 or 324) which allows the user to watch or listen to the same media item being accessed by the contact 312. As described above, upon selecting one of the icons 322 or 324, the user's device requests the appropriate media item and may download the media item through various digital media providers.

The content list 304 may also include a contact menu 320, which allows the user to communicate directly with one or more of the contacts 312. For example, upon requesting to communicate with one or more of the contacts 312, the user's device may initiate a VoIP or IM session with the selected contacts. Other options and features may be provided within the contact list of 304 for providing the user with additional media status information, as well as providing further options for communicating with the contacts 312.

Figure 4:
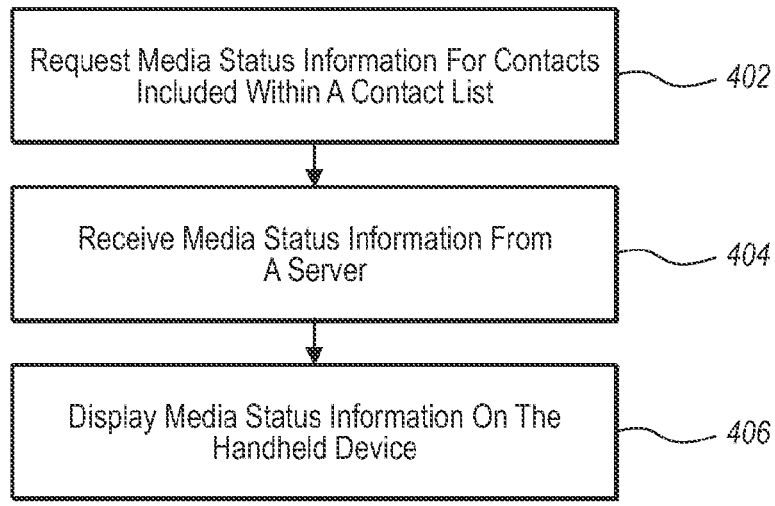
FIG. 4 is a flowchart depicting a method for generating media status information at a user device.

FIG. 4 illustrates one embodiment of a method 400 of generating media status information for one or more contacts. The method 400 may be practiced, for example, in a computing system including a server system, a user's device, and one or more electronic devices used by the user's contacts. The method 400 begins by the user's device requesting 402 media status information for the contacts included in a contact list located on the user's device. This may occur after the user's device connects to the server and/or logs in to the server.

Next, the user's device receives 404 the requested information from the server system for one or more of the contacts in the user's contact list. The media status information may include the types and names of media content that are currently being accessed by each of the user's contacts, the most recent media content that was previously accessed by the contacts, or other information regarding media content associated with the user's contacts, as previously described above. Optionally, the user's device can also receive connection information for one or more of the contacts, the connection information indicating whether the one or more contacts are online, offline, away, busy, and the like.

Once the media status information is gathered for the contacts included within the user's contact list, the media status information is displayed 406 to the user via a graphical display on the user's device. Optionally, the connection information may be displayed as well.

In one embodiment, the method may further include sending and receiving message data to and from the contacts located within the user's contact list using an IP-based messaging protocol. For example, the user of the device may communicate with one or more contacts using VoIP, IM, and the like. Optionally, the user can select and send pre-scripted messages.

In another embodiment, the user can request and/or access a media item currently being accessed or that was previously accessed by one of the user's contacts by providing a specified user input. Upon receiving the user input requesting the media item, the device and/or the server may determine whether the particular media item is already stored on local memory of the device. If so, the device can access and play the particular media item. If not, the device can download all or a portion of the particular media item from a digital media provider, as already described above.

Figure 5:
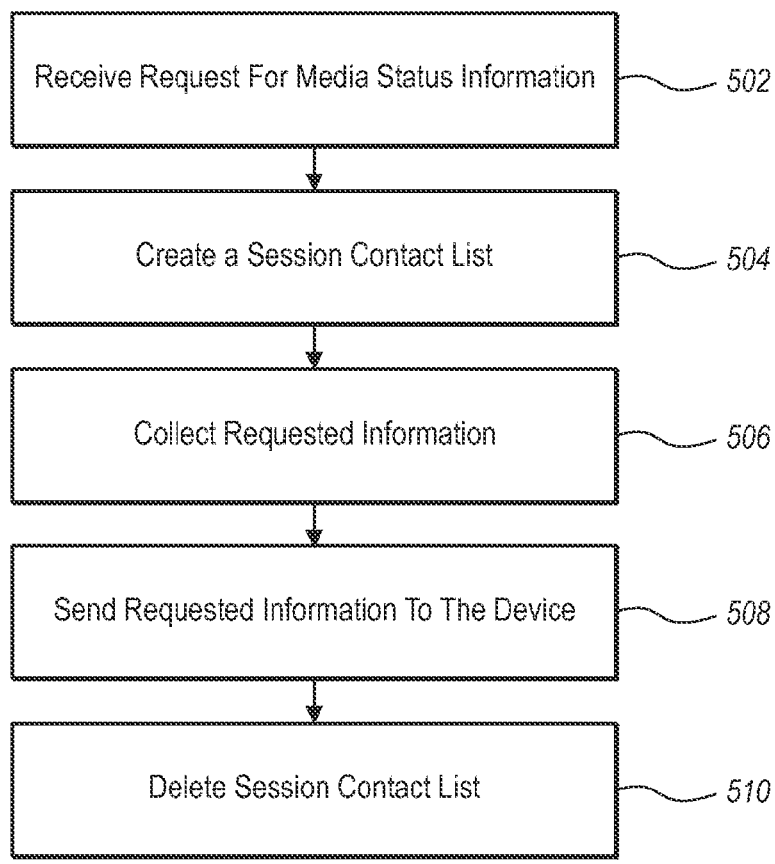
FIG. 5 presents an example method for generating media status information at a server.

FIG. 5 illustrates another embodiment of a method 500 of generating media status information for one or more contacts. Similar to the method 400 of FIG. 4, the method 500 may be practiced, for example, in a computing system including a server system, a user's device, and one or more electronic devices used by the user's contacts. The method 500 may begin after the user's device has logged into the server and requested information, including media status information, for the contacts included in a contact list located on the user's device, whereupon the server receives 502 the request for information from the user's device.

After receiving the information request, the server may create 504 a session contact list. The session contact list may include the contact list from the client device as well as a device identifier for the client device. In this manner, the server can coordinate and arrange the collection of information from the contacts (or more particularly, from devices associated with the contacts), and also transmit the collected information to the device.

The method 500 continues with the server collecting 506 the requested information. Collecting the requested information may include determining if the contacts are logged in to the server and if so, the particular media items being accessed by each contact. If a contact is not logged in to the server and/or if the contact is not accessing any media items, the server may determine a media item that was most recently accessed by the contact. The information that is collected can therefore include at least media status information. Once the requested information has been collected, it is sent 508 to the user's device. Additionally, the information collected and sent to the user's device can include connection information for each contact.

While the device is communicating with the server system (e.g., logged into the server system and/or online), the server may continue to collect media status and/or connection information and send it to the device at periodic and/or non-periodic intervals. When the device ceases to communicate with the server system, the server may delete 510 the session contact list. Alternately and/or additionally, upon determining that the user device is no longer communicating with the server, the server may send a message to the contacts of the user's device, the message including connection information for the user device (e.g., indicating that the user's device is no longer available).

Figure 6B:
FIGS. 6A, 6B and 6C illustrate various views of one embodiment of an electronic media device.
Figure 6C:
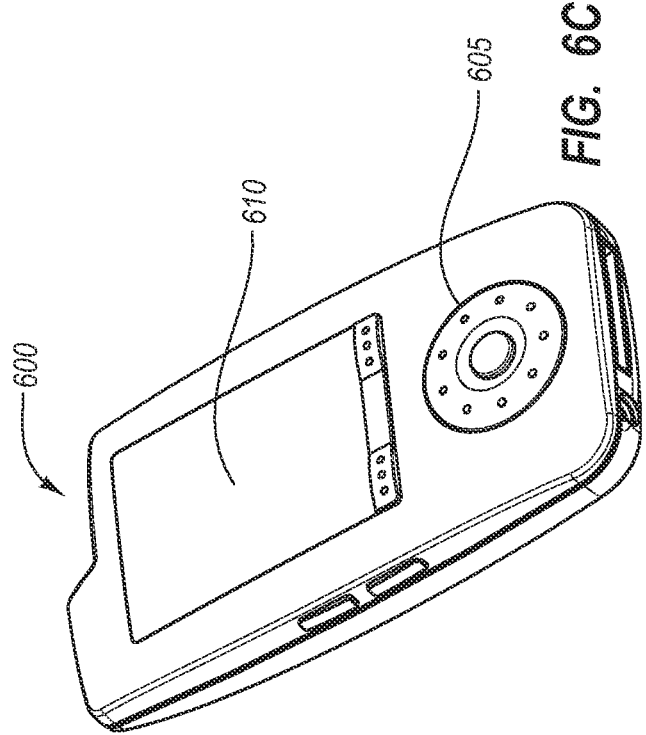
Figure 6A:
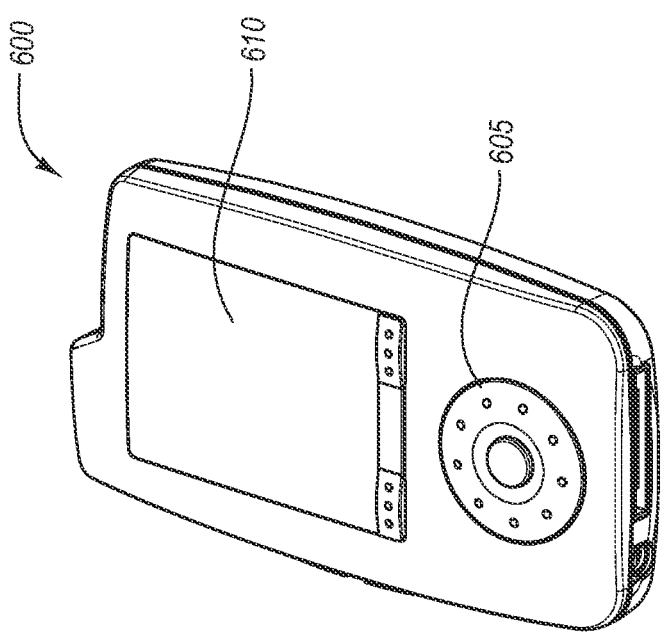

With reference now to FIGS. 6A, 6B and 6C, various views of one embodiment of a device 600 are illustrated. The device 600 may correspond to the device 100 abstractly illustrated in FIG. 1. The device 600 includes a display 610, which may correspond to the display 102 of FIG. 1. The device 600 also includes a user interface 605, comprising a click wheel, which may correspond to the user interface 104 of FIG. 1.

Embodiments herein may comprise a special purpose or general-purpose computer including various computer hardware. A user's device and/or electronic media device is an example of a special-purpose or a general-purpose computer. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a server capable of communicating over a network with a plurality of electronic media devices, including a user device and one or more contact devices, a method of providing media status information for the one or more contact devices to a user device, the method comprising:
   receiving a request for media status information for the one or more contact devices from the user device, the one or more contact devices corresponding to one or more contacts indentified in a contact list stored on the user device, the request including an identifier and contact information taken from the contact list for the one or contact devices, the media status information including one or more media items currently being accessed by the one or more contact devices;
   creating a session contact list in response to receiving the request, the session contact list generated from the user device contact list and including at least a portion of the one or more contact devices identified in the request from the user device, wherein the session contact list also includes the identifier for the one or more contact devices;
   collecting the media status information for the one or more contact devices identified in the session contact list; and
   sending the media status information to the user device, wherein the user device displays the media status information to inform the user of the user device of the one or more media items being accessed by the one or more contact devices.

2. The method of claim 1, further comprising collecting and sending connection information for each of the one or more contacts to the user device, wherein the connection information indicates one or more of: a contact being online, a contact being offline, a contact being away from a corresponding contact device, and a contact being busy.

3. The method of claim 1, wherein the media status information further includes one or more media items most recently accessed by one or more contacts not currently accessing media items.

4. The method of claim 1, wherein collecting the media status information for the one or more contacts identified in the session contact list includes determining whether or not the one or more contacts are logged in to the server.

5. The method of claim 1, further comprising, in response to determining that the user device is no longer communicating with the server, performing one or more of:
   deleting the session contact list; and
   sending a message to the one or more contacts, the message indicating that the user is no longer available.

6. The method of claim 1, wherein the contact list or the session contact list includes the one or more contacts hierarchically organized in accordance with specified group criteria.

7. The method of claim 1, further comprising:
   determining that a media item included in the requested media status information is already contained on a memory of the user device; and
   informing the user device that the media item is stored on the memory such that the user device may locally access the media item without having to receive the media item from the server.

8. The method of claim 1, wherein the media status information includes at least one of song information, video information, podcast information, website information, gaming information, or streaming audio information.

* * * * *